(12) United States Patent
Sakurai et al.

(10) Patent No.: US 9,042,128 B2
(45) Date of Patent: May 26, 2015

(54) SWITCHING POWER SUPPLY

(71) Applicant: FUJI ELECTRIC CO., LTD., Kawasaki-shi (JP)

(72) Inventors: Masahiko Sakurai, Hino (JP); Yukihiro Nishikawa, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 145 days.

(21) Appl. No.: 13/677,275

(22) Filed: Nov. 14, 2012

(65) Prior Publication Data

US 2013/0141947 A1    Jun. 6, 2013

(30) Foreign Application Priority Data

Dec. 1, 2011  (JP) .................. 2011-263318

(51) Int. Cl.
*H02M 3/335* (2006.01)
*H02M 1/00* (2006.01)

(52) U.S. Cl.
CPC .. *H02M 3/33523* (2013.01); *H02M 2001/0032* (2013.01); *Y02B 70/16* (2013.01)

(58) Field of Classification Search
CPC ..................... H02M 3/33523; H02M 3/33507; H02M 2001/0032

USPC ...................... 363/15, 21.16–21.18
See application file for complete search history.

(56) References Cited

U.S. PATENT DOCUMENTS

| 7,672,146 B2 | 3/2010 | Park et al. |
| 2003/0039129 A1 | 2/2003 | Miyazaki et al. |
| 2006/0098462 A1* | 5/2006 | Usui .......................... 363/21.01 |
| 2010/0008109 A1 | 1/2010 | Morota |

FOREIGN PATENT DOCUMENTS

| JP | 07-170731 A | 7/1995 |
| JP | 2003-061350 A | 2/2003 |
| JP | 2010-022121 A | 1/2010 |

* cited by examiner

*Primary Examiner* — Adolf Berhane
*Assistant Examiner* — Yemane Mehari
(74) *Attorney, Agent, or Firm* — Rabin & Berdo, P.C.

(57) ABSTRACT

A flyback type switching power supply includes between P and N of a direct current output a sudden load change detector circuit, which normally has no power consumption, that detects only a transient fluctuation of a direct current output voltage, and starts the switching of a primary side semiconductor switch when there is no load or a light load, even when the semiconductor switch is in an off state, thereby enabling the detection of the direct current output voltage in a tertiary winding, and suppressing a drop in the direct current output voltage.

12 Claims, 13 Drawing Sheets

SWITCHING POWER SUPPLY

CROSS-REFERENCE TO RELATED APPLICATION

This application claims priority under 35 U.S.C. §119 from Japanese Patent Application No. 2011-263318, filed on Dec. 1, 2011, the entirety of which is incorporated herein by reference.

BACKGROUND OF THE INVENTION

1. Technical Field

The present invention relates to a flyback type switching power supply that produces a second direct current voltage isolated by a transformer from a first direct current power source with a switching operation of a semiconductor switch, and in particular, relates to a control circuit that detects a transformer secondary side output voltage using an auxiliary winding (tertiary winding), and controls the output voltage to a constant voltage.

2. Related Art

A switching power supply is utilized as a power supply for a charger or a power supply of a notebook computer AC adaptor in order to supply a constant voltage to a load. As a heretofore known method, there is a method whereby a voltage detector circuit that uses a photo-coupler for isolating and detecting an output voltage Vo is provided on the secondary side of the switching power supply shown in FIG. 13, and the output voltage is controlled to a constant voltage. The output voltage is constantly monitored with this method, meaning that, even when a sudden load change occurs and the output voltage drops, the drop in the output voltage is swiftly detected, and it is possible to control the output voltage to a constant voltage. However, although it is possible to realize a stable control by directly detecting a secondary side voltage, a power loss constantly occurs in the voltage detector circuit that uses the photo-coupler, which is an impediment to energy saving and increased efficiency.

Meanwhile, as a method of obtaining output voltage information without using the voltage detector circuit that uses the photo-coupler, there is a method whereby the output voltage is controlled to a constant voltage, without directly detecting the secondary side voltage, by equivalently detecting the output voltage from a primary side switching voltage waveform. FIG. 10 shows an example of a heretofore known circuit, shown in JP-A-7-170731 and JP-A-2010-22121, that detects a tertiary winding voltage of a transformer, and controls a direct current output voltage to a constant voltage. As JP-A-2010-22121 is an improved version of JP-A-7-170731, there are differences in the voltage detector circuit.

The configuration and operation of the circuit shown in FIG. 10 are as follows. An alternating current input is converted to a direct current voltage in a rectifying circuit 1, and a direct current voltage Vi smoothed in a capacitor 2 is obtained. With the direct current voltage Vi as an input, a primary winding 6-1 of a transformer 6 is on/off controlled by a MOSFET 7 acting as a semiconductor switch. A secondary winding 6-2 of the transformer 6 is connected to a diode 3, and after rectification, the voltage is smoothed in a capacitor 5, becoming a direct current output Vo. A resistor 4 is a dummy resistor for suppressing a rise in voltage when there is no load or a light load. This is a so-called flyback type switching power supply circuit wherein excitation energy is accumulated in the transformer 6 when the MOSFET 7 is turned on, and there is a charging with the excitation energy from the secondary winding 6-2 to the capacitor 5 via the diode 3 when the MOSFET 7 is turned off. A voltage of a tertiary winding 6-3 of the transformer 6 is rectified and smoothed in a diode 12 and capacitor 11, becoming a power source of a control circuit 13. Also, the control of the output voltage Vo to a constant voltage is carried out by detecting a voltage Vt of the tertiary winding 6-3, which is equivalent to a secondary winding voltage of the transformer 6.

A description will be given, using FIGS. 11 and 12, of the principle of output voltage detection using a tertiary winding. When the MOSFET 7 is turned on, a current Ip flows through the primary winding of the transformer 6, and rises. Next, when the MOSFET 7 is turned off, the current flows from the secondary winding 6-2 through the diode 3, becoming a current Is, is charged by a capacitor Co, and becomes the output voltage Vo. When taking a voltage polarity of the secondary winding 6-2 at this time to be positive, the voltages of the secondary winding 6-2 and the tertiary winding 6-3 when the MOSFET 7 is in an on state are both of negative polarity. When the MOSFET 7 is in an off state, and the current Is is flowing through the diode 3 connected to the secondary wiring 6-2, a voltage Vs of the secondary winding 6-2 is the sum of the output voltage Vo and a forward voltage drop Vf of the diode 3. As a result of this, the voltage Vt of the tertiary winding 6-3 is a voltage proportionate to the turns ratio between the secondary winding 6-2 and the tertiary winding 6-3, and is equivalent to detecting the voltage Vs of the secondary winding 6-2. By detecting the detected output voltage Vt and the current Ip flowing through the primary side MOSFET 7, the output voltage is controlled to a constant voltage. Also, when there is a light load or no load, switching control is carried out so as to suppress standby power by lowering a switching frequency.

As heretofore described, with the method whereby the output voltage information is obtained from the primary side switching voltage waveform, using the method whereby the tertiary winding voltage of the transformer is detected, or the like, without using an output voltage detection method whereby the direct current output voltage is directly detected using the photo-coupler, it is not possible to detect the output voltage unless the semiconductor switch is switching. Because of this, when a sudden load change occurs in a state in which the switching frequency is lowered, and power consumption reduced, when there is a light load or no load, it is not possible, even when the output voltage drops due to the sudden load change, to detect the drop in the output voltage until the next switching. When the switching frequency is lower when there is a light load or no load, the interval between switchings is longer, meaning that there is a problem in that there is a transient large drop in the output voltage between the sudden load change occurring and the next switching.

SUMMARY OF THE INVENTION

Consequently, an object of the invention is to provide a switching power supply that, being a flyback type switching power supply that acquires output voltage information using a tertiary winding and controls an output voltage to a constant voltage, can suppress a drop in the output voltage due to a sudden load change when there is a light load or no load in a circuit wherein power consumption is normally low.

In order to solve the heretofore described problem, in a first aspect of the invention, a switching power supply includes a transformer having a primary winding, a secondary winding, and a tertiary winding, a semiconductor switch that on/off controls a first direct current voltage input into the primary winding with a switching operation, an output voltage generation unit that rectifies and smoothes a secondary winding voltage generated in the secondary winding by the switching operation of the semiconductor switch, generating a second direct current voltage as an output voltage, a power source unit that rectifies and smoothes a tertiary winding voltage generated in the tertiary winding by the switching operation of the semiconductor switch, generating a third direct current voltage, a switching control unit that generates a control signal that controls the switching operation of the semiconductor switch, an output voltage detector unit that detects an output voltage based on voltage information of the tertiary winding, and a current detector unit that detects current flowing through the semiconductor switch. The switching power supply supplies a constant output voltage to a load connected to the output voltage generation unit by controlling a turning on and off of the semiconductor switch in accordance with the current detected by the current detector unit and the voltage detected by the output voltage detector unit, includes in the output voltage generation unit a sudden load change detector circuit that detects a drop in the output voltage due to a sudden load change, or the like, and starts a switching in response to a detected sudden load change detection signal.

In a second aspect of the invention, a gate pulse of the semiconductor switch is generated with the sudden load change detection signal detected in the sudden load change detector circuit according to the first aspect of the invention as a trigger signal, a drop in output voltage is detected by switching, and the drop in output voltage is suppressed.

In a third aspect of the invention, a switching frequency is increased by a voltage for controlling the switching frequency in accordance with the sudden load change detection signal detected in the sudden load change detector circuit according to the first aspect of the invention being changed, a drop in output voltage due to a sudden load change, or the like, is detected by switching, and the drop in output voltage is suppressed.

In a fourth aspect of the invention, the sudden load change detector circuit according to the first to third aspects of the invention is of a configuration wherein power loss in a normal state is suppressed by the sudden load change detector circuit not operating in the normal state, but operating only when the output voltage drops due to the sudden load change, or the like.

In a fifth aspect of the invention, the sudden load change detector circuit according to the first to fourth aspects of the invention is of a configuration wherein a series circuit of a capacitor, a photo-coupler primary side diode, and a resistor is connected between a positive electrode and a negative electrode of the output voltage generation unit.

According to the invention, a flyback type switching power supply, which detects a tertiary winding voltage and controls an output voltage to a constant voltage, detects a sudden load change using a differentiating circuit, which normally has no power consumption, that detects only a transient fluctuation of a direct current output voltage, and starts the switching of a primary side semiconductor switch when there is no load or a light load, even when the semiconductor switch is in an off state, thereby enabling the detection of the direct current output voltage in a tertiary winding and suppressing a drop in the direct current output voltage. As a result of this, it is possible to reduce power consumption and to suppress the drop in the direct current output voltage when there is the sudden load change.

DETAILED DESCRIPTION OF THE EMBODIMENTS

A main point of the invention is that a flyback type switching power supply, which detects a tertiary winding voltage and controls an output voltage to a constant voltage, includes a sudden load change detector circuit, which normally has no power consumption, that detects only a transient fluctuation of a direct current output voltage, and starts the switching of a primary side semiconductor switch when there is no load or a light load, even when the semiconductor switch is in an off state, thereby enabling the detection of the direct current output voltage in a tertiary winding, and suppressing a drop in the direct current output voltage.

First Embodiment

Figure 1:
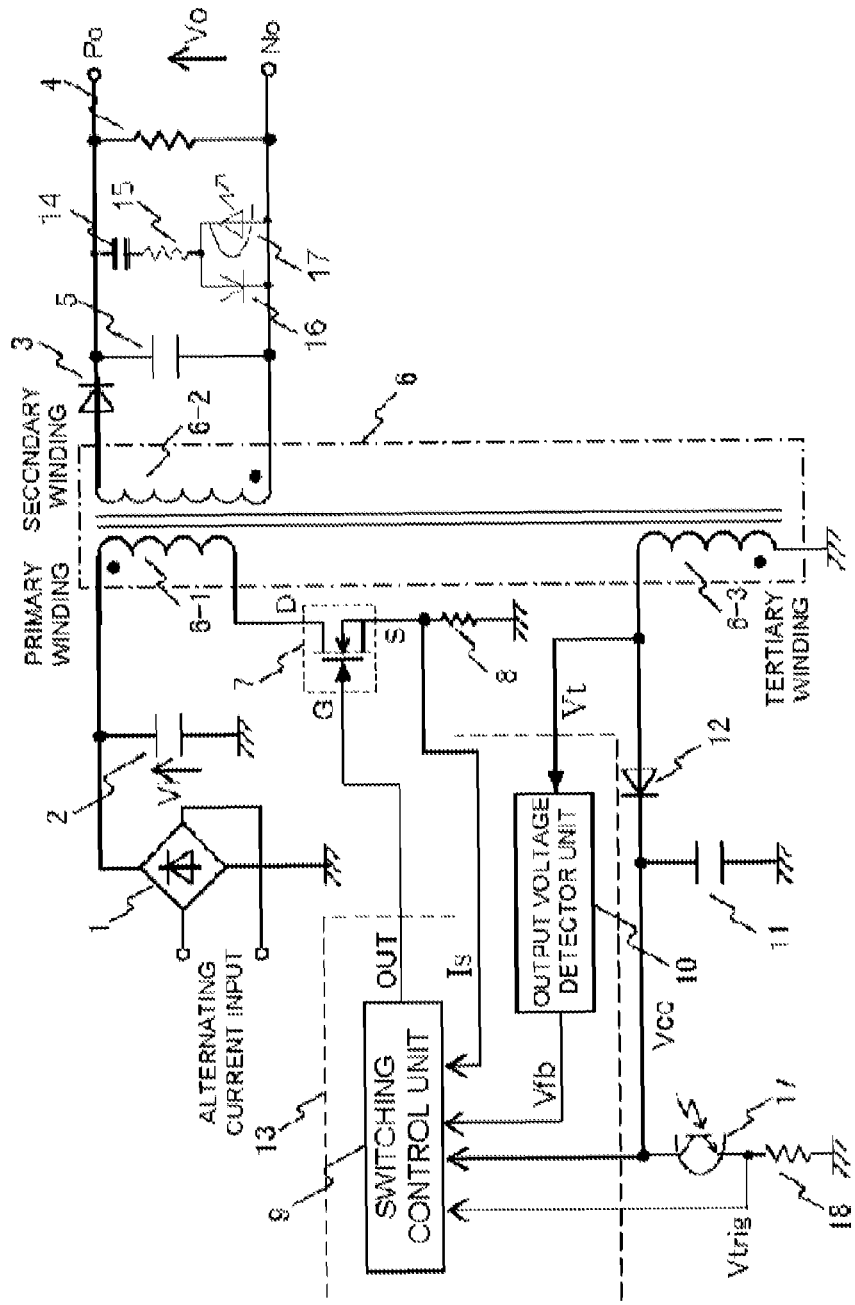
FIG. 1 is an overall circuit diagram showing embodiments of the invention.
Figure 2:
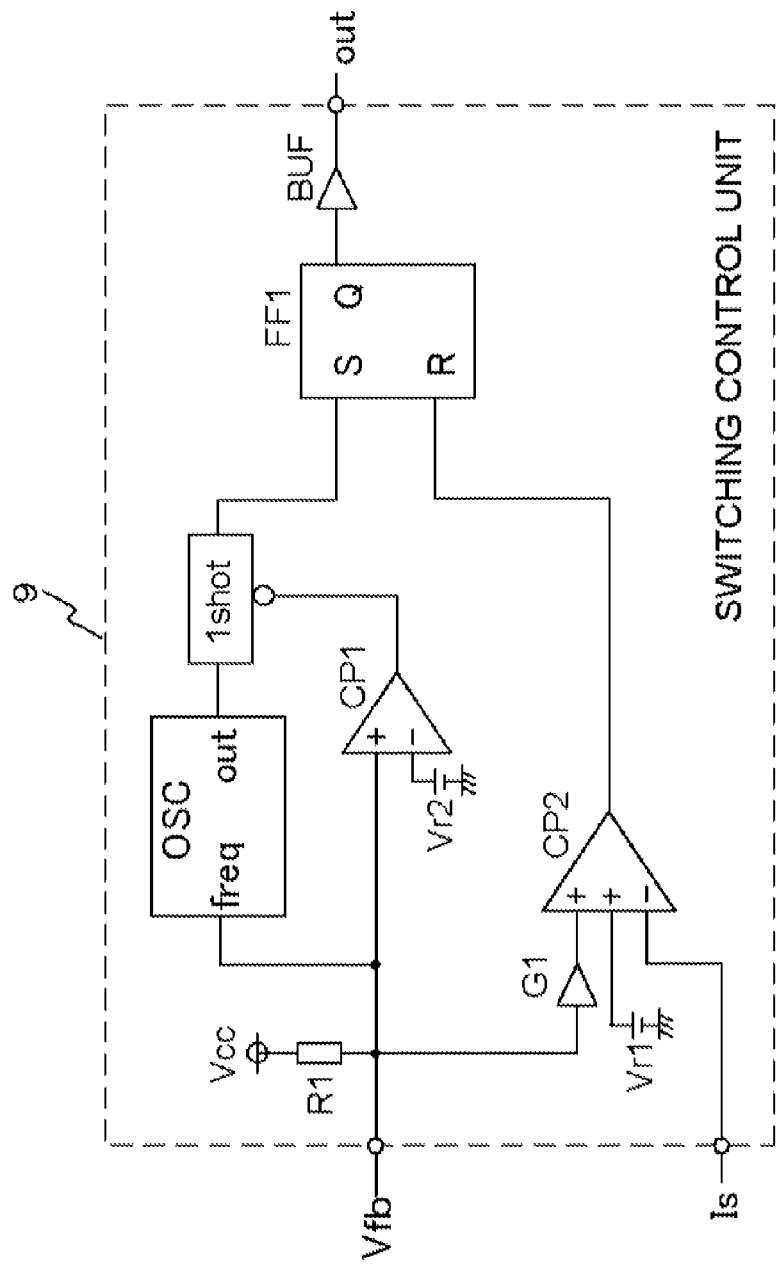
FIG. 2 is a detailed circuit diagram of a switching control unit of FIG. 1.
Figure 3:
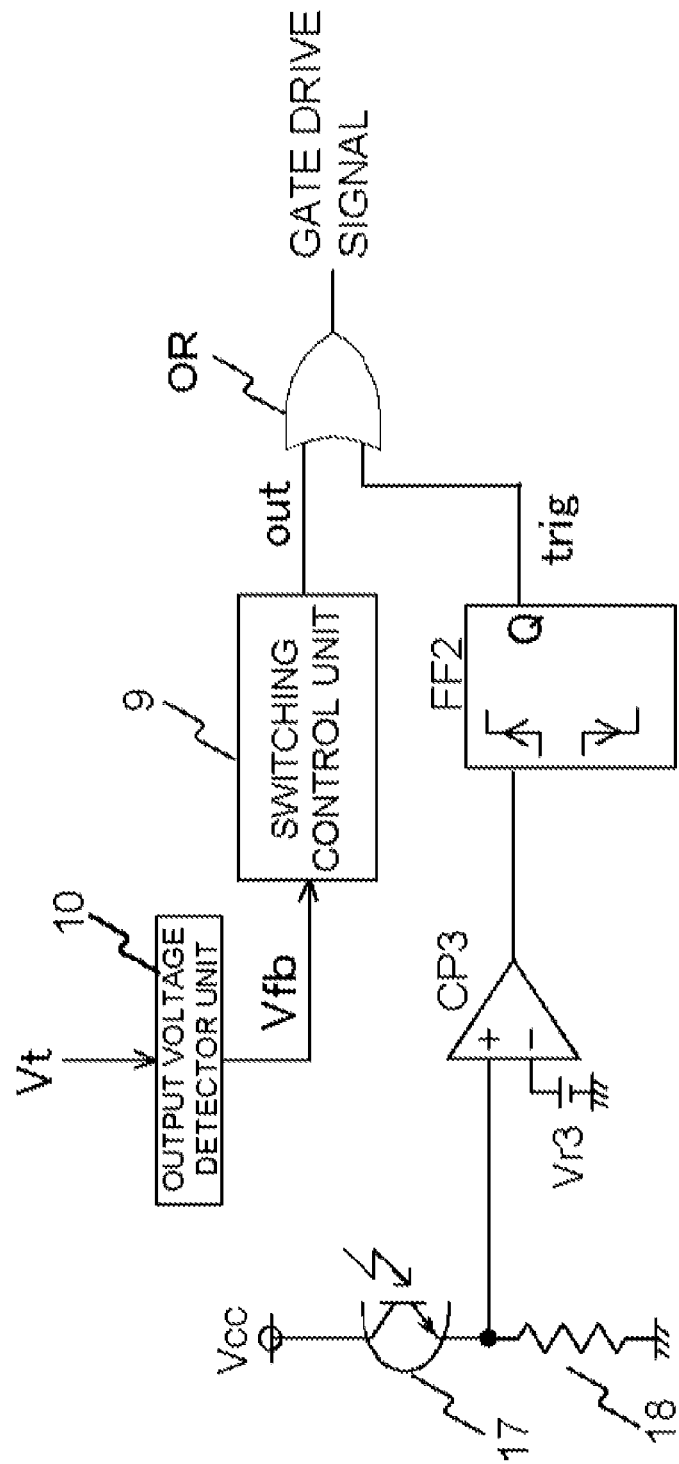
FIG. 3 shows a first embodiment of the invention.
Figure 4:
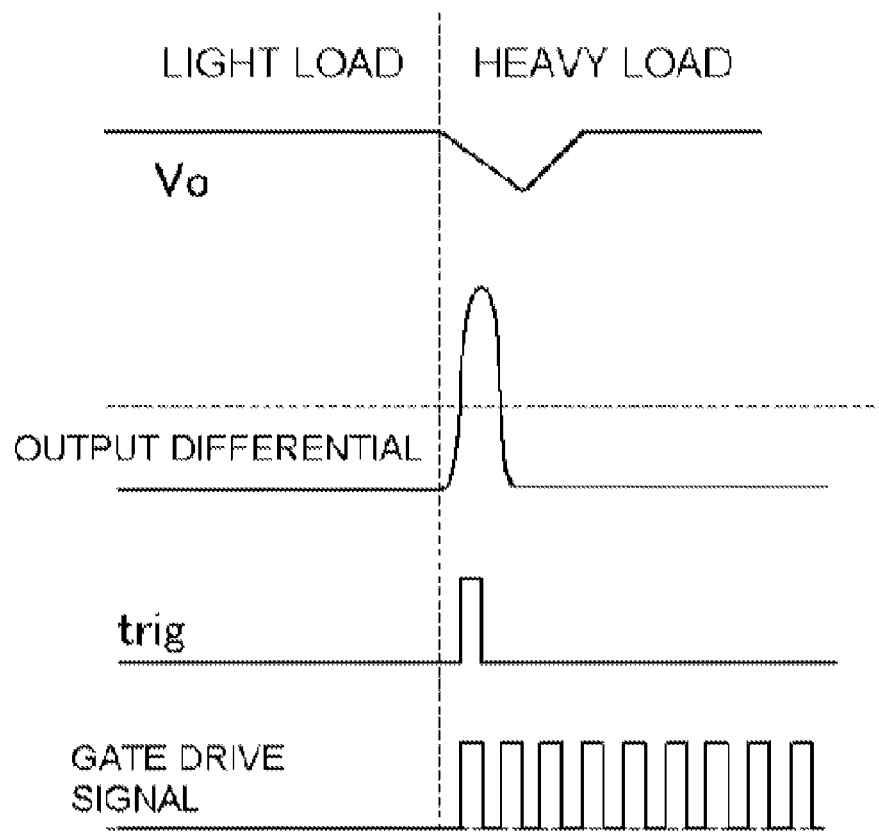
FIG. 4 shows an operating waveform diagram of the first embodiment of the invention.

FIG. 1 shows an overall circuit of embodiments of the invention, FIG. 2 a detailed circuit of a switching control unit 9, FIG. 3 a first embodiment of the invention, and FIG. 4 operating waveforms.

FIG. 1 is an overall circuit example of a main circuit configuration of a switching power supply of the invention. In the drawing, a transformer 6 has a primary winding 6-1 into which a direct current input voltage Vin is input, a secondary winding 6-2 for outputting an output voltage Vo, and a tertiary winding 6-3 for generating a power source voltage Vcc of a control circuit 13 at the same time as detecting a voltage generated in the secondary winding 6-2. As the polarities of the primary winding 6-1 and the secondary winding 6-2 are mutually opposite, the switching power supply of the invention is a flyback type. A diode 3, a rectifying and smoothing circuit formed of a capacitor 5, and a dummy resistor 4 for suppressing the rise of the output voltage when there is a light load or no load, are connected to the secondary winding 6-2, and this rectifying and smoothing circuit forms an output voltage generation unit of the switching power supply of the invention.

The output voltage generation unit is of a configuration such that the output voltage Vo, wherein a flyback voltage generated on the secondary side is rectified and smoothed, is supplied to a load in accordance with a switching of a switching element 7. In the same way, a diode 12 and a rectifying and smoothing circuit formed of a capacitor 11 are connected to the tertiary winding 6-3, and an output of this rectifying and smoothing circuit forms the power source voltage Vcc of the control circuit 13. The switching element 7, being a MOSFET acting as a semiconductor switch, is configured of three terminals—a drain terminal D, a gate terminal G, and a source terminal S—and turns a switch on and off in response to a control signal received in the gate terminal G. Further, current flowing through the primary wiring 6-1 of the transformer 6 is switching controlled by this turning on and off. The control circuit 13 for switching control, being a circuit for on/off controlling the MOSFET 7, detects a voltage Vt of the tertiary winding in an output voltage detector unit 10, and generates a switching signal in the switching control unit 9, thereby on/off controlling the MOSFET 7. The switching control unit 9 controls a gate signal on-width and a switching frequency based on a feedback voltage Vfb from the output voltage detector unit 10 and a primary winding current Is of the transformer 6 detected by a shunt resistor 8, and outputs an on/off signal from an OUT terminal to the gate of the MOSFET 7. The tertiary winding 6-3 being of the same polarity as the secondary winding 6-2, the feedback voltage Vfb in accordance with the output voltage Vo is generated in the output voltage detector unit 10, with the voltage Vt of the tertiary winding 6-3 as an input, and sent to the switching control unit 9.

The circuit configuration of the switching control unit 9 is shown in FIG. 2. The switching control unit 9 is configured of a variable frequency oscillator OSC, a comparator CP1, which controls an output signal of the oscillator in accordance with the size of the feedback signal, a comparator CP2, which compares the size of the feedback signal and the primary winding current Is of the transformer 6 and generates a signal for turning off an output pulse, a one-shot circuit 1 shot, a flip-flop FF1, and the like, and outputs a pulse based on the primary winding current Is and the feedback voltage Vfb, whose frequency is variable and whose width is controlled in accordance with the load, to the terminal OUT. Herein, reference sign BUF is a buffer gate for impedance conversion, and reference sign G1 is an amplifier.

A circuit configured of a series circuit of a capacitor 14, a resistor 15, and a primary side diode of a photo-coupler 17, connected between output terminals Po and No of the output voltage generation unit, and a diode 16 connected in reverse parallel to the primary side diode of the photo-coupler 17 is a sudden load change detector circuit for detecting a sudden change in the direct current output voltage. As this circuit is such that the capacitor 14 is normally in a charged state, and power consumption is of a slight amount caused by a leakage current of the capacitor, hardly any loss occurs. When the direct current output voltage drops due to a sudden change in the load, or the like, a charge of the capacitor 14 is drained through the load along a path from the capacitor 14, through the load, the photo-coupler 17 primary side diode, and the resistor 15 to the capacitor 14, and current flows through the photo-coupler 17 primary side diode. As this current has a differentiated waveform, the loss thereof is also slight. As the diode 16 is for charging the capacitor 14 after a sudden change in the load is detected, it is sufficient that the diode 16 charges the capacitor 14 by the time of the next voltage drop, meaning that the diode 16 can also be replaced by a high impedance resistor.

The sudden load change detector circuit is a circuit that functions as an output voltage differentiating circuit, and does not operate in a normal state as the output voltage is constant. Because of this, it is possible to suppress loss when the output voltage is constant. When there is a light load or no load, current flows through a light emitting diode portion of the photo-coupler when a sudden load change occurs, and the output voltage drops, in a state in which the frequency is lowered in order to suppress standby power, and a sudden load change detection signal is transmitted to the primary side.

Figure 11:
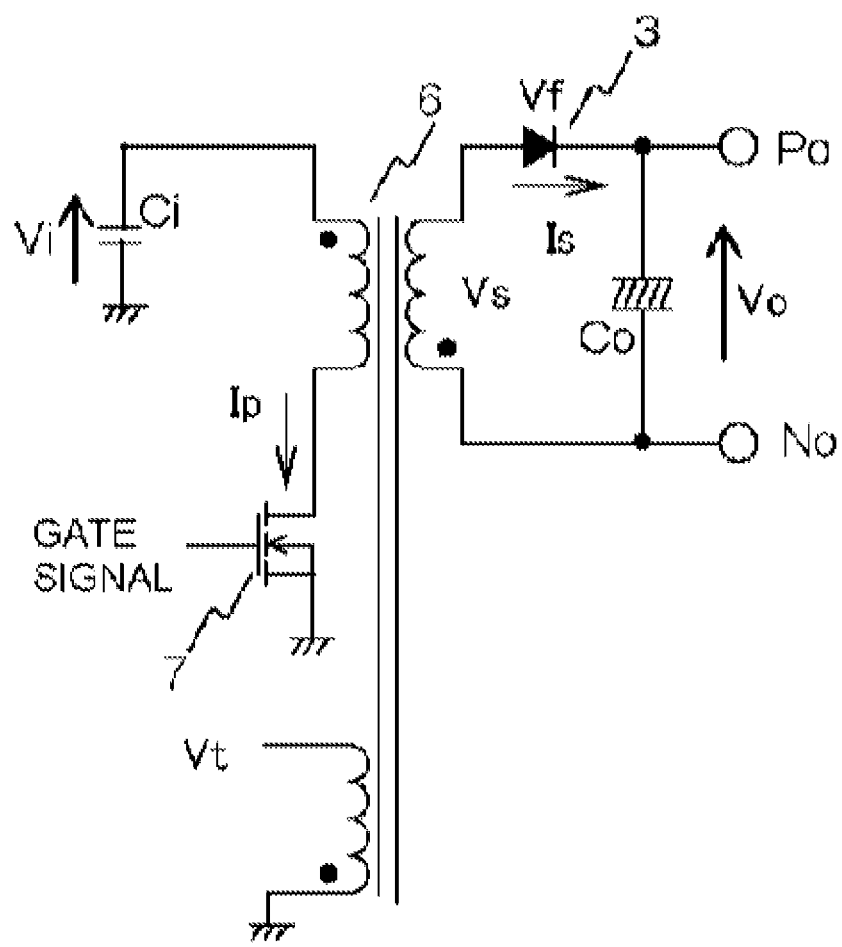
FIG. 11 is a circuit diagram for illustrating an operation of a flyback type switching power supply.
Figure 12:
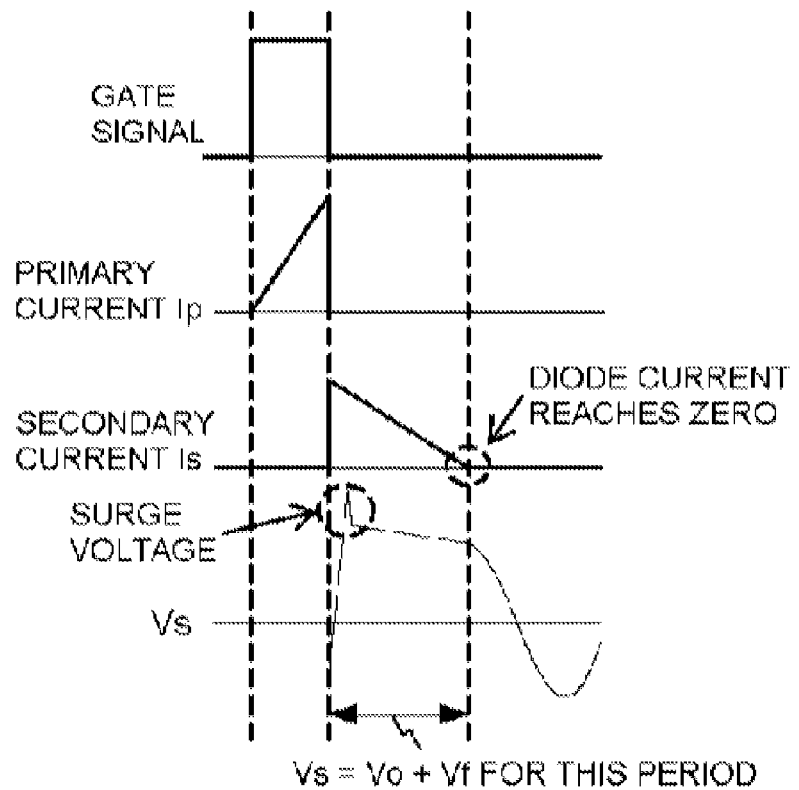
FIG. 12 is an operating waveform diagram of each portion of FIG. 11.
Figure 13:
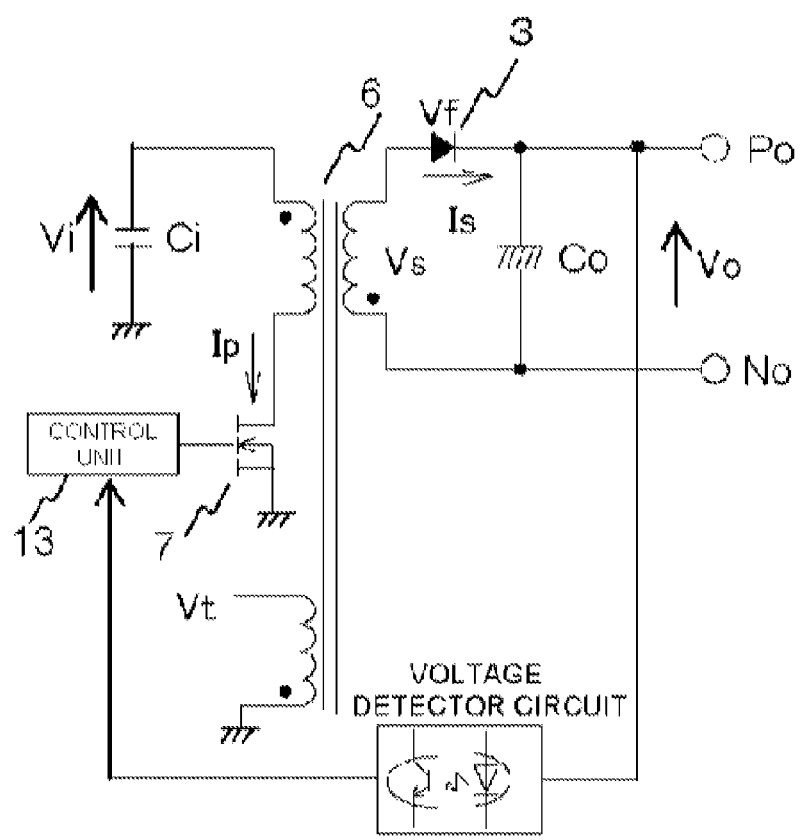
FIG. 13 is a circuit diagram for feeding back a direct current output voltage.

FIG. 3 shows an embodiment wherein a signal from the sudden load change detector circuit is detected, and switching of the MOSFET 7 is started. A series circuit of a phototransistor of the photo-coupler 17 and a resistor 18 is connected to the control power source voltage Vcc, and when the output voltage drops, current flows through the light emitting diode portion of the photo-coupler 17, the phototransistor is turned on, this is detected by a comparator CP3, a trigger signal is output by a flip-flop FF2, and a MOSFET 7 gate drive signal is emitted via a logical sum gate OR. Operating waveforms are shown in FIG. 4. When a drop in the direct current output voltage Vo occurs, a differentiating current flows through the phototransistor of the photo-coupler 17 of the sudden load change detector circuit, a trigger voltage trig is generated in an output of the flip-flop FF2, and the semiconductor switch 7 is turned on and off. As a result of this, as illustrated in FIGS. 11 and 12, it is possible to detect the voltage of the secondary winding in the tertiary winding 6-3, meaning that it is possible to suppress a drop in the output voltage with a normal output voltage control.

Second Embodiment

Figure 5:
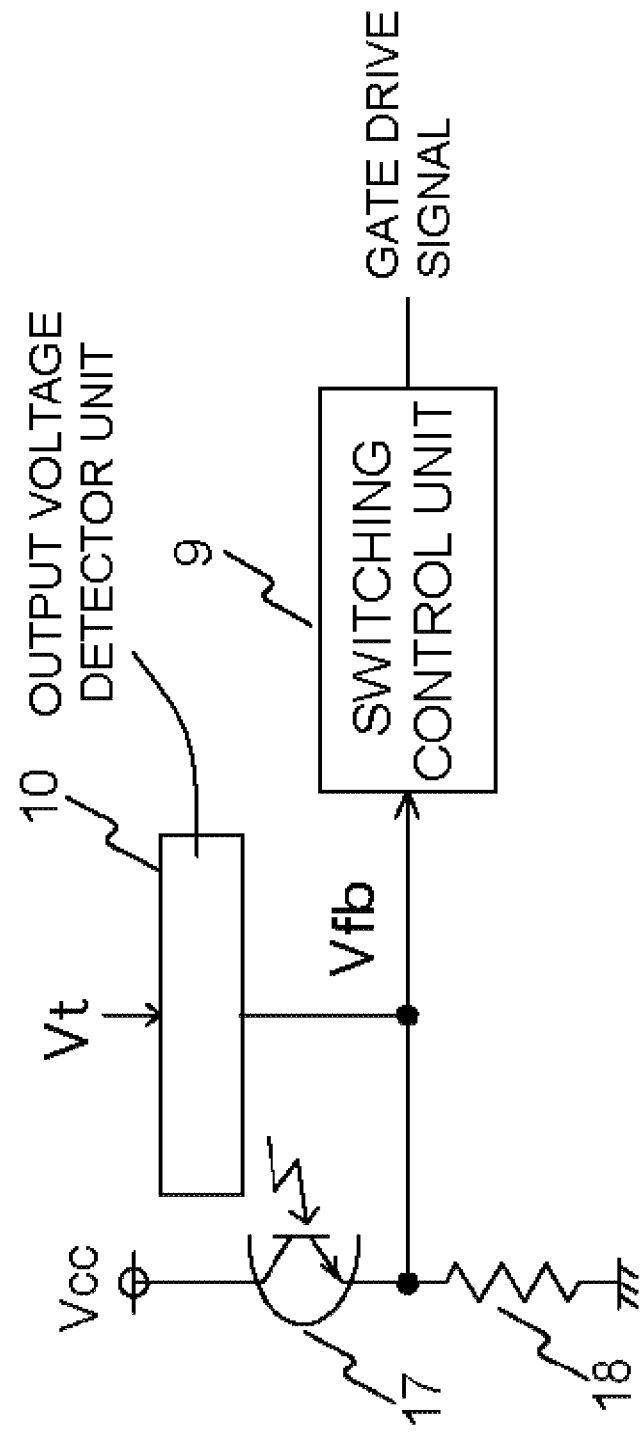
FIG. 5 shows a second embodiment of the invention.
Figure 6:
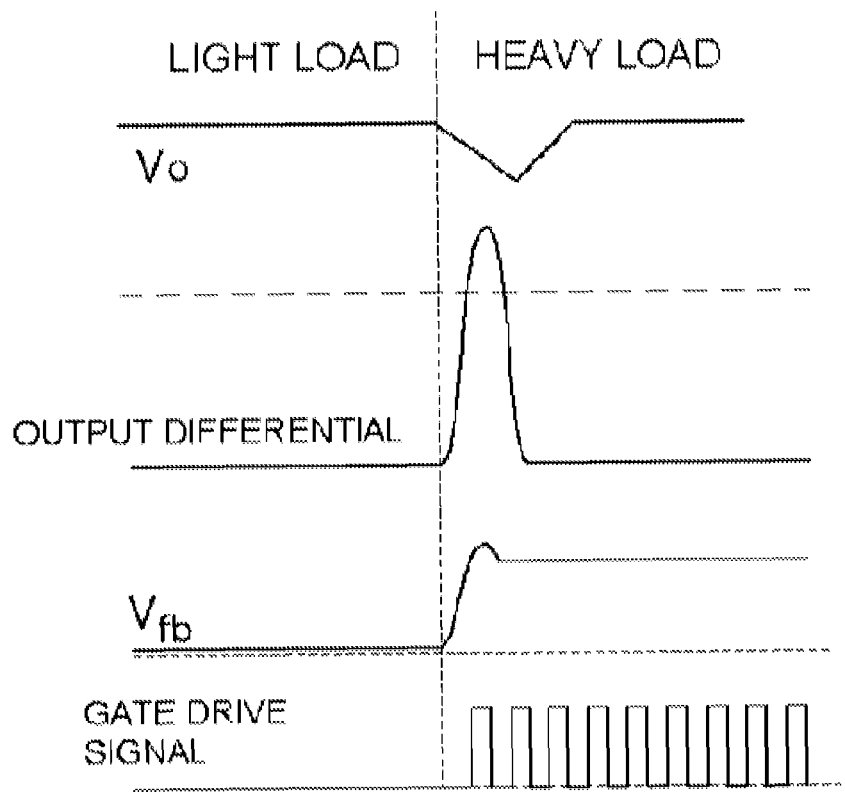
FIG. 6 is an operating waveform diagram of the second embodiment of the invention.
Figure 7:
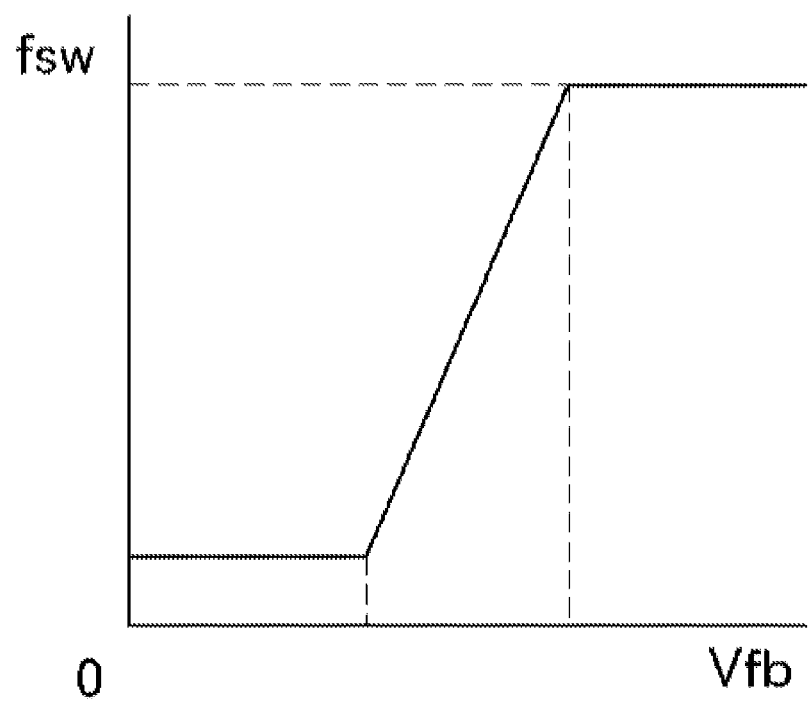
FIG. 7 is a diagram showing the relationship between a feedback voltage and a switching frequency.

FIG. 5 shows a second embodiment of the invention, and FIG. 6 shows operating waveforms. The first embodiment of the invention is a configuration wherein a trigger signal for the semiconductor switch is compiled (e.g., caused or generated) by a signal from the sudden load change detector circuit, but the second embodiment of the invention is a configuration wherein a sudden load change signal detected by the series circuit of the phototransistor and the resistor 18 is input as a feedback signal into the switching control unit 9, thereby increasing the switching frequency of a gate signal for the semiconductor switch 7. The relationship between the feedback voltage Vfb and a switching frequency Fsw is shown in FIG. 7. It can be seen that when the feedback voltage Vfb is increased, the switching frequency Fsw increases. As the frequency when there is a light load or no load is low when the switching frequency is increased, switching is started immediately, even when the semiconductor switch 7 is in an off state. As a result of this, as illustrated in FIGS. 11 and 12, it is possible to detect the voltage of the secondary winding in the tertiary winding 6-3, meaning that it is possible to suppress a drop in the output voltage with a normal output voltage control.

Figure 8:
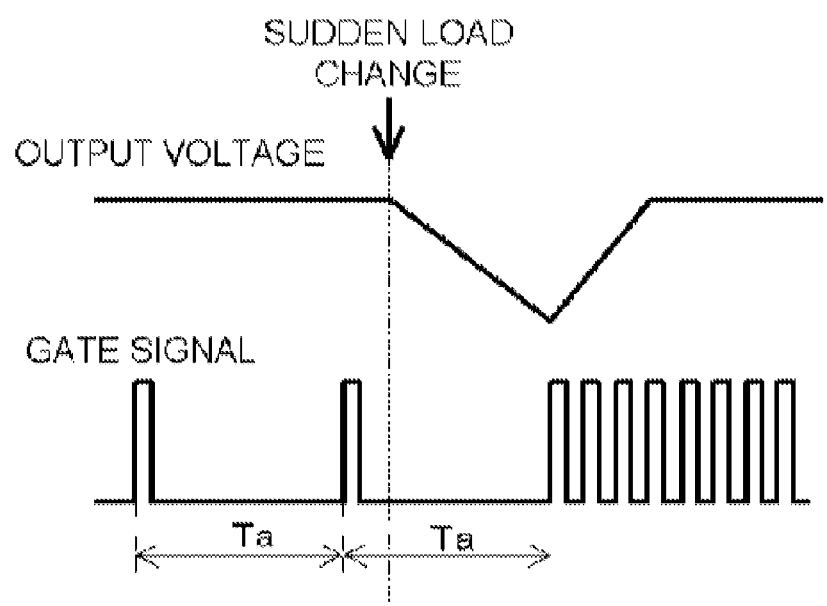
FIG. 8 is a heretofore known operation diagram when there is a sudden load change.
Figure 9:
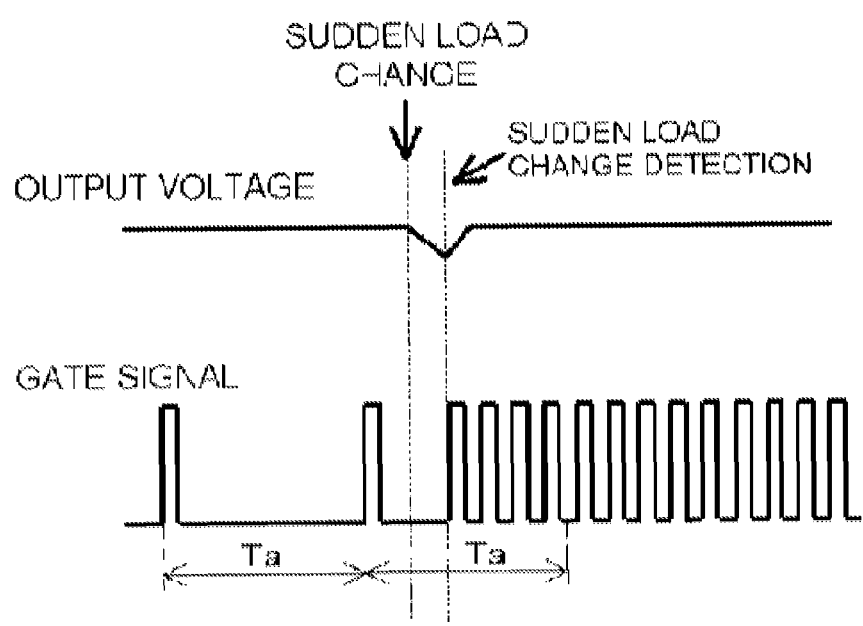
FIG. 9 is an operation diagram of the invention when there is a sudden load change.
Figure 10:
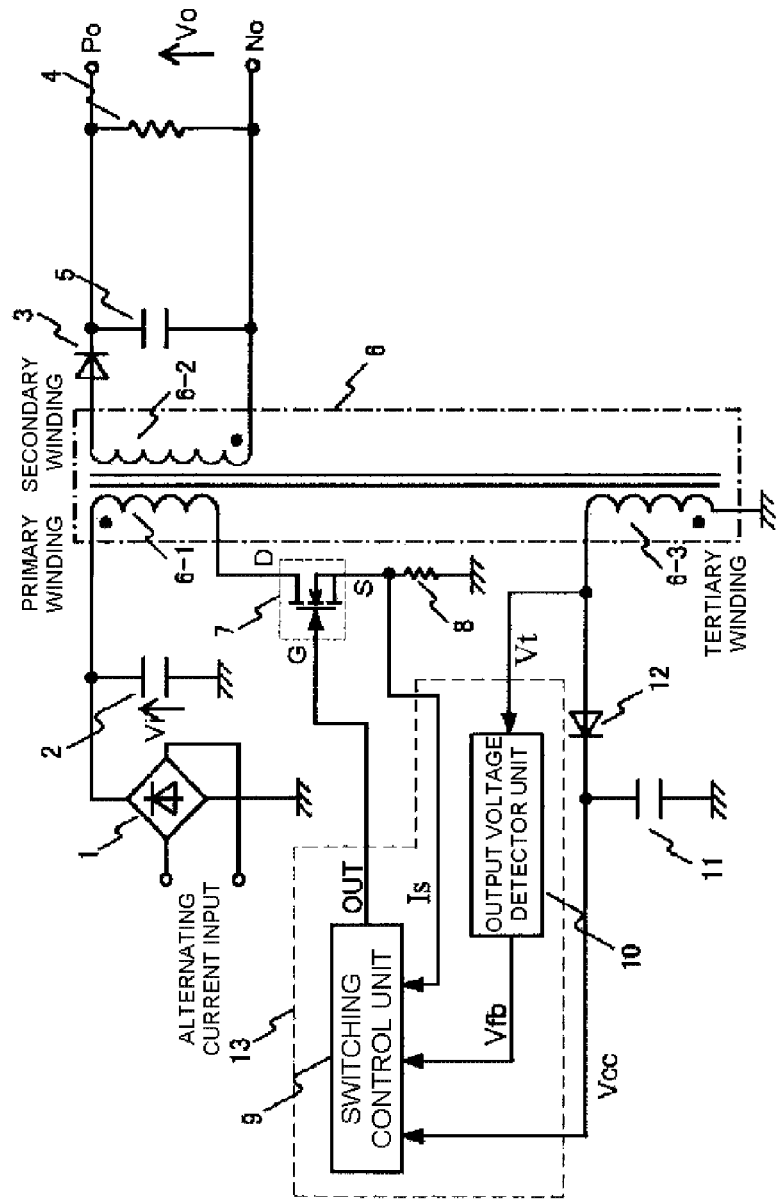
FIG. 10 is a heretofore known tertiary winding voltage feedback type circuit diagram.

FIG. 8 shows the relationship between the output voltage and switching operation with a heretofore known control, and FIG. 9 the relationship between the output voltage and switching operation when the invention (first embodiment and second embodiment) is applied. With the heretofore known control, when a sudden load change occurs, output voltage control is carried out after the next on/off signal is provided to the semiconductor switch, but it can be seen that when the invention is applied, the semiconductor switch starts turning on and off immediately upon a sudden load change being detected by the sudden load change detector circuit, meaning that a drop in the output voltage is kept small.

In the heretofore described embodiments, a hard switching flyback type circuit is shown as the switching circuit, but the switching circuit can also be realized as a pseudo resonance type switching circuit wherein a resonant capacitor is connected in parallel with the semiconductor switch. Also, the switching circuit can also be realized in the same way when using a synchronous rectification type rectifying circuit wherein a MOSFET is connected in reverse parallel to a diode connected to the secondary winding.

The invention, being control technology that suppresses a transient drop in a direct current output voltage caused by a sudden load change, or the like, when detecting feedback of the direct current output voltage in a tertiary winding and controlling the output voltage to a constant voltage, can be applied to an AC adaptor, a charger, a control power source of various kinds of instrument, and the like.

While the present invention has been particularly shown and described with reference to certain specific embodiments, it will be understood by those skilled in the art that the foregoing and other changes in form and details can be made therein without departing from the spirit and scope of the present invention.

What is claimed is:

1. A switching power source device, comprising:
   a transformer having a primary winding, a secondary winding, and a tertiary winding;
   a semiconductor switch that on/off controls a first direct current voltage input into the primary winding with a switching operation;
   an output voltage generation unit that rectifies and smoothes a secondary winding voltage generated in the secondary winding by the switching operation of the semiconductor switch, generating a second direct current voltage as an output voltage;
   a power source unit that rectifies and smoothes a tertiary winding voltage generated in the tertiary winding by the switching operation of the semiconductor switch, generating a third direct current voltage;
   a switching control unit that generates a control signal that controls the switching operation of the semiconductor switch;
   an output voltage detector unit that detects a transformer voltage based on voltage information of the tertiary winding; and
   a current detector unit that detects current flowing through the semiconductor switch, wherein
   the switching power source device supplies a constant output voltage to a load connected to the output voltage generation unit by controlling a turning on and off of the semiconductor switch in accordance with the current detected by the current detector unit and the voltage detected by the output voltage detector unit, includes in the output voltage generation unit a sudden load change detector circuit that detects a drop in the output voltage due to conditions including a sudden load change, outputs a corresponding sudden load change detection signal, and starts a switching in response to the sudden load change detection signal to suppress the drop in the output voltage.

2. The switching power source device according to claim 1, wherein
   a gate pulse of the semiconductor switch is generated with the sudden load change detection signal as a trigger signal, a drop in the output voltage is detected by switching, and the drop in the output voltage is suppressed.

3. The switching power source device according to claim 1, wherein
   a switching frequency is increased by a voltage for controlling the switching frequency in accordance with a change in the sudden load change detection signal, a drop in the output voltage due to conditions including a sudden load change is detected by switching, and the drop in the output voltage is suppressed.

4. The switching power source device according to claim 1, wherein
   the sudden load change detector circuit is of a configuration wherein power loss is prevented or reduced in a normal state, due to the sudden load change detector circuit not operating in the normal state, but operating only when the output voltage drops due to conditions including a sudden load change.

5. The switching power source device according to claim 1, wherein
   the sudden load change detector circuit is of a configuration wherein a series circuit of a capacitor, a photocoupler primary side diode, and a resistor is connected between a positive electrode and a negative electrode of the output voltage generation unit.

6. The switching power source device according to claim 2, wherein
   the sudden load change detector circuit is of a configuration wherein power loss is prevented or reduced in a normal state, due to the sudden load change detector circuit not operating in the normal state, but operating only when the output voltage drops due to conditions including a sudden load change.

7. The switching power source device according to claim 3, wherein
   the sudden load change detector circuit is of a configuration wherein power loss is prevented or reduced in a normal state, due to the sudden load change detector circuit not operating in the normal state, but operating only when the output voltage drops due to conditions including a sudden load change.

8. The switching power source device according to claim 2, wherein
   the sudden load change detector circuit is of a configuration wherein a series circuit of a capacitor, a photocoupler primary side diode, and a resistor is connected between a positive electrode and a negative electrode of the output voltage generation unit.

9. The switching power source device according to claim 3, wherein
   the sudden load change detector circuit is of a configuration wherein a series circuit of a capacitor, a photocoupler primary side diode, and a resistor is connected between a positive electrode and a negative electrode of the output voltage generation unit.

10. The switching power source device according to claim 4, wherein
    the sudden load change detector circuit is of a configuration wherein a series circuit of a capacitor, a photocoupler primary side diode, and a resistor is connected between a positive electrode and a negative electrode of the output voltage generation unit.

11. The switching power source device according to claim 6, wherein
    the sudden load change detector circuit is of a configuration wherein a series circuit of a capacitor, a photocoupler primary side diode, and a resistor is connected between a positive electrode and a negative electrode of the output voltage generation unit.

12. The switching power source device according to claim 7, wherein
    the sudden load change detector circuit is of a configuration wherein a series circuit of a capacitor, a photocoupler primary side diode, and a resistor is connected between a positive electrode and a negative electrode of the output voltage generation unit.

* * * * *